United States Patent
Trautenberg

(10) Patent No.: US 7,508,341 B2
(45) Date of Patent: Mar. 24, 2009

(54) METHOD AND ARRANGEMENTS FOR THE TRANSMISSION OF PSEUDOLITE TRAJECTORIES WITHIN NAVIGATION DATA OF A SATELLITE NAVIGATION SYSTEM

(75) Inventor: Hans Ludwig Trautenberg, Neumarkt (DE)

(73) Assignee: EADS Astrium GmbH, Munich (DE)

( * ) Notice: Subject to any disclaimer, the term of this patent is extended or adjusted under 35 U.S.C. 154(b) by 656 days.

(21) Appl. No.: 10/930,785

(22) Filed: Sep. 1, 2004

(65) Prior Publication Data
US 2005/0083232 A1    Apr. 21, 2005

Related U.S. Application Data

(63) Continuation of application No. PCT/EP03/02459, filed on Mar. 11, 2003.

(30) Foreign Application Priority Data
Mar. 16, 2002   (DE) .................................. 102 11 714

(51) Int. Cl.
*G01S 5/14* (2006.01)
*G01S 1/08* (2006.01)

(52) U.S. Cl. .................................. 342/357.09; 342/386

(58) Field of Classification Search ............ 342/357.09, 342/357.1, 385, 386; 701/213
See application file for complete search history.

(56) References Cited

U.S. PATENT DOCUMENTS

| | | | | |
|---|---|---|---|---|
| 4,963,889 A | 10/1990 | Hatch | ..................... | 342/357.08 |
| 5,072,227 A | 12/1991 | Hatch | ..................... | 342/357.04 |
| 5,177,489 A | 1/1993 | Hatch | ..................... | 342/357.04 |
| 5,606,506 A | 2/1997 | Kyrtsos | ..................... | 701/207 |
| 5,686,924 A | 11/1997 | Trimble et al. | ..................... | 342/357.09 |
| 5,708,440 A | 1/1998 | Trimble et al. | ..................... | 342/357.06 |
| 5,752,207 A | 5/1998 | Saranapani | ..................... | 701/26 |
| 5,886,665 A * | 3/1999 | Dosh et al. | ..................... | 701/213 |
| 5,886,666 A * | 3/1999 | Schellenberg et al. | ..................... | 701/3 |
| 6,101,178 A | 8/2000 | Beal | ..................... | 370/336 |

(Continued)

FOREIGN PATENT DOCUMENTS

DE       4411725       10/1994

(Continued)

OTHER PUBLICATIONS

Farley, M.G. et al, "A New Pseudolite Battlefield Navigation System," IEEE Plans, Apr. 1998, pp. 208-217.*

(Continued)

*Primary Examiner*—Gregory C Issing
(74) *Attorney, Agent, or Firm*—Greenblum & Bernstein, P.L.C.

(57) ABSTRACT

Method for the transmission of navigation data to user terminals of a satellite navigation system composed of navigation satellites and pseudolites. The method includes transmitting positional information for at least one of the pseudolites, as part of the navigation data, without the use of separate channels or protocols for the transmission of the positional information for the at least one pseudolite. The positional information is transmitted in the form of a model of a pseudolite trajectory in a reference coordinate system which the model accounts for orbit-divergent motions of the at least one pseudolite, and the positional information for the at least on pseudolite forms a part of the navigation data.

3 Claims, 2 Drawing Sheets

U.S. PATENT DOCUMENTS

| | | | |
|---|---|---|---|
| 6,204,812 B1 | 3/2001 | Fattouche et al. | 342/457 |
| 6,208,297 B1 | 3/2001 | Fattouche et al. | 342/450 |
| 6,266,014 B1 | 7/2001 | Fattouche et al. | 342/450 |
| 6,300,898 B1 | 10/2001 | Schneider et al. | 342/357.09 |
| 6,336,076 B1 | 1/2002 | Farley et al. | 701/213 |

FOREIGN PATENT DOCUMENTS

| | | |
|---|---|---|
| DE | 19640282 | 4/1997 |
| DE | 19948556 | 6/2000 |
| EP | 0507845 | 3/1996 |
| EP | 0604404 | 6/1998 |
| EP | 0936516 | 1/2002 |
| WO | WO 97/38326 A1 * | 10/1997 |

OTHER PUBLICATIONS

E.W. Grafarend et al., "Das Global Positioning System", Physik Journal, vol. 1, No. 1, pp. 39-44.

* cited by examiner

METHOD AND ARRANGEMENTS FOR THE TRANSMISSION OF PSEUDOLITE TRAJECTORIES WITHIN NAVIGATION DATA OF A SATELLITE NAVIGATION SYSTEM

CROSS-REFERENCE TO RELATED APPLICATIONS

The present application is a Continuation of International Patent Application No. PCT/EP03/02459 filed Mar. 11, 2003 and claims priority under 35 U.S.C. §119 of German Patent Application No. 102 11 714.4, filed on Mar. 16, 2002. Moreover, the disclosure of International Patent Application No. PCT/EP03/02459 is expressly incorporated by reference herein in its entirety.

BACKGROUND OF THE INVENTION

Field of the Invention

The present invention concerns the transmission of navigation data to user terminals of a satellite navigation system, which comprises navigation satellites and pseudolites.

The use of pseudolites to increase the precision and redundancy of satellite navigation systems, in particular in those areas of the Earth's surface in which only a limited line-of-sight to navigation satellites exists, is known in principle from U.S. Pat. No. 5,177,489 A and from U.S. Pat. No. 5,686,924 A.

U.S. Pat. No. 6,101,178 A describes various possibilities for communicating the position of pseudolites to a user terminal. On the basis of the position data of the pseudolites and the navigation data received from the pseudolites, the user terminal can then either increase the precision of the determination of its own position with the aid of navigation satellites or it can perform the position determination with the aid of the pseudolites in regions where the reception of navigation data from some or all navigation satellites is impaired.

However in these known devices, there is a problem that additional radio resources such as separate radio channels or special protocols are necessary in order to transmit the positional information of the pseudolites to the user terminals. Thus, such positional information of the pseudolites can be received and utilized only by user terminals which, in comparison to customary user terminals of a satellite navigation system, must contain additional receiving components that have to be specially adapted to this information and additional transmission channels, and valuable radio resources are occupied. For customary user terminals, which do not have these special, additional functions, the transmission of pseudolite positional information is not transparent, i.e. it cannot be used by these user terminals.

U.S. Pat. No. 6,336,076 B1 proposes that pseudolites transmit a pseudolite Global Positioning Signal which can be a modified version of a conventional GPS satellite ephemeris message. This message contains, in particular, ephemeris data for a GPS satellite or for a pseudolite. Thus, the positions of the pseudolites as well as the GPS satellites are to be transmitted with the aid of ephemeris data, which are based on Kepler's equations, hence on the description of an orbit in a central force field. However, such a description of the pseudolites with the aid of ephemeris data does not reflect the real motion of the pseudolites in an inertial coordinate system, since for example the pseudolites fixed on the Earth's surface just do not move freely in an orbit in a central force field.

E. W. Grafarend, V. S. Schwarze: "Das Global Positioning System", Physik Journal 1 (2002) No. 1, Wiley-VCH-Verlag GmbH, p. 39-44, proposes, in determining the orbit of navigation satellites, to also account for relativistic effects that can lead to a deviation of the satellite orbit from a Keplerian orbit. However, no mention of pseudolites is made there, and moreover, relativistic effects that are based on a relativistic trajectory correction are not detectable in navigation with the aid of pseudolites. Hence, the proposals described there are not relevant for pseudolites.

U.S. Pat. No. 5,886,666 describes an airborne pseudolite navigation system as augmentation to a GPS satellite navigation system. In this connection, data which describe a fixed position of a pseudolite based on Kepler's equations are transmitted as part of a modified GPS satellite ephemeris message. Divergences from this fixed position can optionally be transmitted in the form of a vector error correction over a separate data link to the navigation terminals. In this case, as well, either only inadequate descriptions of the real motion of the pseudolites are provided, or alternatively, separate channels are again provided for the transmission of additional correction data to describe orbit-divergent motions of the pseudolites.

SUMMARY OF THE INVENTION

One aspect of the present invention is thus to provide an option that remedies these disadvantages of the prior art and in particular, permits improved determination of pseudolite positions. This aspect is attained through a method for the transmission of navigation data to user terminals of a satellite navigation system. The system includes navigation satellites and pseudolites. Positional information for at least one pseudolite is transmitted in the form of a model of a pseudolite trajectory in a reference coordinate system. The model accounts for orbit-divergent motions of the at least one pseudolite. The positional information for the at least one pseudolite is transmitted as part of the navigation data without separate channels or protocols being used for the transmission of the positional information for the at least one pseudolite.

This aspect is also attained through a satellite navigation system having navigation satellites and pseudolites. The navigation satellites and the pseudolites have transmission devices for transmitting navigation data to user terminals. The pseudolites each have a device for preparing model data of a pseudolite trajectory in a reference coordinate system. The model data account for orbit-divergent motions of the at least one pseudolite. Moreover, the device is designed to insert the model data into the navigation data to be transmitted.

This aspect may also be attained through a user terminal for a satellite navigation system having a receiving device to receive navigation data from navigation satellites and pseudolites into which model data of a pseudolite trajectory in a reference coordinate system have been inserted using the above-note method. Additionally, a position model decoding device is provided for extracting the model data of a pseudolite trajectory in a reference coordinate system from the navigation data. Moreover, the position model decoding device furthermore is designed to account for model data of orbit-divergent motions of at least one pseudolite and to perform position determination of at least one pseudolite on the basis of the model data, without separate devices being provided for receiving and for decoding separate channels or protocols for the positional information of pseudolites.

Moreover the aspect may be attained through a computer program for processing navigation data from navigation satellites and pseudolites, into which model data of a pseudolite trajectory in a reference coordinate system have been inserted in accordance with the above-noted method. The computer program accounts for model data for orbit-divergent motions of at least one pseudolite, and the computer program is designed to work together with a position model decoding device of a user terminal noted above. Additionally, the aspect may be attained through a computer program product containing a machine-readable program medium, on which a computer program as described above, is stored in the form of electronically readable control signals.

Another aspect of the present invention is a method for the transmission of navigation data to user terminals of a satellite navigation system which comprises navigation satellites and pseudolites. The invention provides that positional information for at least one pseudolite is transmitted as part of the navigation data in the form of a model of a pseudolite trajectory in a reference coordinate system, wherein the model accounts for orbit-divergent motions of the at least one pseudolite. This is not provided for in the prior art according to U.S. Pat. No. 6,101,178 A or U.S. Pat. No. 6,336,076 B1. Rather, it is described there, in U.S. Pat. No. 6,101,178 A, column 9, that while navigation satellites do indeed transmit information by a satellite almanac, ephemeris correction data and clock correction data as part of their navigation data, this is not however provided for pseudolites. While U.S. Pat. No. 6,336,076 B1 does indeed describe the transmission of ephemeris data, which is to say the description of orbital motions for pseudolites, this is generally an unsuitable model for describing the actual motions of the pseudolites. The advantage of the method in accordance with the invention is, firstly, that no separate channels or protocols are needed for transmission of the positional information of the pseudolites, but instead this transmission takes place as part of the transmission of navigation data that is provided in any case. In addition, the positional information of the pseudolites is not transmitted as absolute positions, but rather in the form of a model of a pseudolite trajectory in a reference coordinate system, wherein the model accounts for orbit-divergent motions of the at least one pseudolite. An inertial coordinate system whose origin lies at the Earth's center and in which the Earth rotates, for example, can be used as reference coordinate system. Alternatively, however, a reference coordinate system can be chosen that rotates, nutates and precesses identically to the Earth, hence a reference coordinate system in which the Earth is stationary. The use of a model for a pseudolite trajectory, which model accounts for orbit-divergent motions of the at least one pseudolite, permits greater precision of the positional information and of the position determination of the pseudolites and of the user terminal, since predeterminable or estimated motions of the pseudolites relative to a user terminal can be taken into account in the model.

As part of the model for the pseudolite trajectory the changes in the surface structure of the Earth with time, in particular, can be taken into account. These changes in the surface structure of the Earth with time can give rise to a movement of a pseudolite fixed on the surface of the Earth, which movement can have quite palpable influences on the measurement precision, especially for determinations of position with high precision. Such changes in the surface structure of the Earth with time are caused in particular by the ocean tides when a pseudolite is fixed on the surface of the ocean, or by the tides of the continental plates of land. These periodically occurring, and hence predictable, changes in the surface structure of the Earth with time can be integrated into the model for the pseudolite trajectory in a reference coordinate system.

However, the pseudolite trajectory can also describe another type of movement of the pseudolite, especially when the pseudolite is not fixed on the surface of the Earth, but instead is installed on a suitable land vehicle, watercraft, aircraft, or spacecraft, whose movements can be described by a suitable model. This could, for example, find application for the installation of pseudolites on satellites whose orbit is, for example, higher or lower than the orbit of the navigation satellites.

On the other hand, the format of the data to be transmitted can also be simplified when positional information for navigation satellites is also transmitted as part of the navigation data, since then the data formats and possibly also the data content of the positional information of the pseudolites and of the navigation satellites can be unified. In this context, provision can in particular be made that positional information for navigation satellites is also transmitted as part of the navigation data in the form of a model of a navigation satellite trajectory in the same reference coordinate system as for the pseudolites. A common model for the pseudolite trajectory and for the navigation satellite trajectory can be used here, which may consist of a first submodel for describing orbital motions and a second submodel for describing orbit-divergent motions.

Alternatively, however, provision can also be made that while additional positional information for navigation satellites is indeed transmitted as part of the navigation data in the form of a model of a navigation satellite trajectory in the same reference coordinate system as for the pseudolites, however, separate models are used for the pseudolite trajectory and for the navigation satellite trajectory, and identification of the applicable model is provided within the navigation data. Such identification can be accomplished, for example, through an additional data area within the navigation data, for example through a special flag which is placed ahead of the model data and indicates the type of model (pseudolite model or navigation satellite model).

Thus, in principle, it is possible for the navigation satellites and the pseudolites to use at least a unified data format for transmission of the navigation data and the positional information contained therein. For examples of a unified data format, reference can be made to U.S. Pat. No. 6,336,076 B1. As a result, the processing of the received navigation data in the user terminal is significantly simplified, which also reduces the corresponding expense for manufacture and operation of the user terminals. Furthermore, provision can also be made that the same frequency or the same frequency band is used by the navigation satellites and the pseudolites for transmission of the navigation data, and a unique code for code-division multiplex encoding of the navigation data is used by each pseudolite and by each navigation satellite. As a result, particularly the expense for the user terminals can also be reduced, since only one frequency or only one frequency band must be received, and the requirement for transmission capacity (frequencies or frequency bands) is reduced as well.

Alternatively, however, some of the pseudolites or all of the pseudolites can use the same code of a code-division multiplex encoding. This applies in particular to certain pseudolites for which no impairment of the user terminals results when these pseudolites use the same code. Examples for this are pseudolites that are widely separated spatially, wherein here, for example, a limited number of codes could be selected and these codes could repeat spatially at defined distances. However, provision can also be made that in areas where the navigation data of the pseudolites that use the same code interfere, the user terminals detect these interferences and do not use the navigation data from these pseudolites for navigation.

A further aspect of the present invention is a satellite navigation system having navigation satellites and pseudolites, wherein the navigation satellites and the pseudolites have transmission devices for transmitting navigation data to user terminals. In accordance with the invention, provision is made that the pseudolites each have a device designed on the one hand for preparing model data of a pseudolite trajectory in a reference coordinate system wherein the model data account for orbit-divergent motions of the at least one pseudolite, and on the other hand for inserting the model data into the navigation data. Consequently, simplified navigation data can be prepared and simplifications result for the user terminals, as was already explained with reference to the method described above. This satellite navigation system is thus designed to transmit navigation data to the user terminals in accordance with a method described above.

Moreover, provision can be made that the navigation satellites each have a device for preparing model data of a navigation satellite trajectory in the same reference coordinate system and for inserting the model data into the navigation data. Provision is especially made here that all devices for preparing model data are designed such that a common model for the pseudolite trajectory and for the navigation satellite trajectory is used, which can consist of a first submodel for describing orbital motions and a second submodel for describing orbit-divergent motions. Alternatively, however, the devices for preparing model data of the pseudolites and the navigation satellites can be designed such that separate models are used for the pseudolite trajectory and for the navigation satellite trajectory, and identification of the applicable model is provided within the navigation data. The method already described may be used for this purpose, and the already mentioned advantages obtain.

In particular, all transmission devices and devices for preparing model data can be designed such that a unified data format for transmission of the navigation data is used by the navigation satellites and the pseudolites. In addition, all transmission devices for transmission of navigation data can be designed such that the same frequency or the same frequency band is used by the navigation satellites and the pseudolites for transmission of the navigation data, and a unique code for code-division multiplex encoding of the navigation data is used by each pseudolite and each navigation satellite. With regard to the advantages that result herefrom, please refer to the explanations of the method already described.

Alternatively, however, provision can also be made that the transmission devices for transmitting navigation data of the pseudolites are designed such that some of the pseudolites or all of the pseudolites use the same code for code-division multiplex encoding of the navigation data. This applies in particular to certain pseudolites for which no impairment of the user terminals results when these pseudolites use the same code. Examples for this are pseudolites that are widely separated spatially, wherein here, for example, a limited number of codes could be selected and these codes could repeat spatially at defined distances. However, provision can also be made that in areas where the navigation data of the pseudolites that use the same code interfere, the user terminals detect these interferences and do not use the navigation data from these pseudolites for navigation.

A further aspect of the present invention is a user terminal for a satellite navigation system having a receiving device to receive navigation data from navigation satellites and pseudolites into which model data of a pseudolite trajectory in a reference coordinate system have been inserted according to a method described above. In accordance with the invention, the user terminal includes a position model decoding device for extracting the model data of a pseudolite trajectory in a reference coordinate system from the navigation data, wherein furthermore the position model decoding device is designed to account for model data of orbit-divergent motions of at least one pseudolite and to perform position determination of at least one pseudolite on the basis of the model data. Such a device can, in particular, be implemented with significantly less effort than separate devices for receiving and decoding separate channels or protocols for positional information of pseudolites, as the prior art requires. Moreover, because the model data are taken into account, such a user terminal permits significantly more precise determination of the position of pseudolites, and as a result also permits a significantly more precise determination of its own position than permitted to date by prior art.

This applies in particular when the position model decoding device is also designed to extract model data of a navigation satellite trajectory in the same reference coordinate system from the navigation data and to determine the position of at least one navigation satellite on the basis of the model data. In this way the data processing effort in the user terminal can be unified and thus further simplified significantly.

Provision can be made in this case that the position model decoding device is designed to identify and extract a common model for the pseudolite trajectory and for the navigation satellite trajectory, which model can consist of a first submodel for describing orbital motions and a second submodel for describing orbit-divergent motions. Alternatively, however, provision can also be made that the position model decoding device is designed to identify and extract separate models for the pseudolite trajectory and for the navigation satellite trajectory based on identification of the applicable model within the navigation data. Which of the possibilities is chosen depends on which type of model was chosen in the above-described method.

The receiving device and the position model decoding device of a user terminal are designed to process a unified data format from the navigation satellites and pseudolites. If all navigation data from all pseudolites and all navigation satellites are transmitted on the same frequency or in the same frequency band, then the receiving device of the user terminal will be designed such that on the one hand navigation data from the navigation satellites and the pseudolites can be received on the same frequency or in the same frequency band, and on the other hand the navigation data from each pseudolite and each navigation satellite are decoded with the aid of its own code for code-division multiplex decoding. Thus, for decoding the navigation data a different code is used for every pseudolite and every navigation satellite in accordance with a conventional code-division multiplexing method.

A further aspect of the present invention is a computer program for processing navigation data from navigation satellites and pseudolites, into which model data of a pseudolite trajectory in a reference coordinate system have been inserted in accordance with an above-described method, wherein the computer program accounts for model data for orbit-divergent motions of at least one pseudolite. Furthermore, the computer program can be adapted such that it can even process navigation data that were created in accordance with an above-described method beyond the insertion of model data of a pseudolite trajectory in a reference coordinate system, thus for example also with regard to navigation satellite trajectories, specific models and data formats, etc. The computer program here is designed to work together with a position model decoding device of a user terminal as has been described above.

The invention also encompasses a computer program product containing a machine-readable program medium on which an above-described computer program is stored in the form of electronically readable control signals. The control signals can be stored in any suitable form; the electronic readout can then correspondingly take place through electrical, magnetic, electromagnetic, electro-optic, or other electronic device. Examples for such program media are magnetic tapes, diskettes, fixed disks, CD-ROMs and semiconductor components.

One aspect of the invention includes a method for the transmission of navigation data to user terminals of a satellite navigation system composed of navigation satellites and pseudolites. The method includes transmitting positional information for at least one of the pseudolites, without the use of separate channels or protocols for the transmission of the positional information for the at least one pseudolite. The positional information is transmitted in the form of a model of a pseudolite trajectory in a reference coordinate system which the model accounts for orbit-divergent motions of the at least one pseudolite, and wherein the positional information for the at least on pseudolite forms a part of the navigation data. Moreover, the model for the pseudolite trajectory can take into account at least one of changes in the surface structure of the Earth with time and relative motion of the at least one pseudolite relative to the surface of the Earth. The method can further include transmitting positional information for the navigation satellites in the form of a model of a navigation satellite trajectory in the same reference coordinate system and using the same model for the pseudolite trajectory. Additionally, the model can comprise a first submodel that describes orbital motions and a second submodel that describes orbit-divergent motions, and the positional information for the navigation satellites can form part of the navigation data. The method can further include transmitting positional information for the navigation satellites in the form of a model of a navigation satellite trajectory in the same reference coordinate system and using a different model for the pseudolite trajectory. Identification of the model can be included within the navigation data. The method may also include utilizing a unified data format by the navigation satellites and the pseudolites for transmission of the navigation data. Moreover, the method can include transmitting the navigation data of the navigation satellites and the pseudolites in at least one of a same frequency and a same frequency band, and encoding the navigation data for each pseudolite and each navigation satellite with a unique code for code-division multiplex. Additionally, a plurality of the pseudolites can use a common code for code-division multiplex encoding of the navigation data.

Another aspect of the present invention includes a satellite navigation system composed of navigation satellites and pseudolites. The system further includes navigation satellite transmitters, associated with the navigation satellites, that transmit navigation data to user terminals, pseudolite transmitters, associated with the pseudolites, that transmit navigation data to user terminals, and modeling devices that are structured and arranged to prepare model data of a pseudolite trajectory in a reference coordinate system, associated with each of the pseudolites. The model data accounts for orbit-divergent motions of each of the pseudolites, and the modeling devices are configured to insert the model data into the navigation data. Moreover, the satellite navigation system can include a navigation satellite modeling device structured and arranged to prepare model data of a navigation satellite trajectory in the same reference coordinate system, and the model data can inserted into the navigation data. Moreover, the model data of said pseudolite modeling device can be the same as the model data of navigation satellite modeling device, and the model data includes a first submodel that describes orbital motions and a second submodel that describes orbit-divergent motions. Additionally, the satellite navigation system can further include a navigation satellite modeling device structured and arranged to prepare model data of a navigation satellite trajectory in the same reference coordinate system, wherein the model data is inserted into the navigation data. Moreover, the model data of said pseudolite modeling device can be different from the model data of navigation satellite modeling device, the model data comprises a first submodel that describes orbital motions and a second submodel that describes orbit-divergent motions, and identification of the applicable model is included within the navigation data. Additionally, the navigation satellite transmitters, pseudolite transmitters, and the modeling devices can be configured such that a unified data format for transmission of the navigation data is used by the navigation satellites and the pseudolites. Moreover, all transmitters that transmit navigation data can be configured such that the same frequency or the same frequency band is used by the navigation satellites and the pseudolites for transmission of the navigation data, and a unique code for code-division multiplex encoding of the navigation data can be used by each pseudolite and by each navigation satellite. Additionally, the pseudolite transmitters can be configured such that the pseudolites use a common code for code-division multiplex encoding of the navigation data. Also, the pseudolites can be installed on one of land vehicles, watercraft, aircraft, spacecraft, or on satellites whose orbits are higher or lower than the orbits of the navigation satellites.

Yet another aspect of the invention includes a user terminal for a satellite navigation system, the satellite navigation system transmitting navigation data from navigation satellites and pseudolites that includes model data of a pseudolite trajectory in a reference coordinate system inserted as noted above. The user terminal includes a receiver for receiving the navigation data, and a position model decoding device structured and arranged to extract the model data of a pseudolite trajectory in the reference coordinate system from the navigation data, to account for model data of orbit-divergent motions of at least one pseudolite, and to determine a position of at least one pseudolite according to the model data, without separate devices for receiving and for decoding separate channels or protocols for positional information of pseudolites. Moreover, the position model decoding device can be configured to extract from the navigation data model data of a navigation satellite trajectory in the same reference coordinate system and to determine the position of at least one navigation satellite on a basis of the model data. Also, the position model decoding device can be further configured to identify and extract a common model for the pseudolite trajectory and for the navigation satellite trajectory, which model comprises a first submodel that describes orbital motions and a second submodel for describing orbit-divergent motions. Moreover, the position model decoding device can also be configured to extract model data of a navigation satellite trajectory in the same reference coordinate system from the navigation data and to determine the position of at least one navigation satellite on a basis of the model data. The position model decoding device can be configured to identify and extract separate models for the pseudolite trajectory and for the navigation satellite trajectory based on identification of the applicable model within the navigation data. Moreover, the receiving device and the position model decoding device can be structured and arranged to process a unified data format from the navigation satellites and the pseudolites. The receiving device can be configured such that the navigation data from the navigation satellites and the pseudolites can be received on the same frequency or in the same frequency band, and the navigation data from each pseudolite and each navigation satellite can be decoded with the aid of a separate code for code-division multiplex decoding. The present invention also includes a computer program for processing navigation data from navigation satellites and pseudolites, into which model data of a pseudolite trajectory in a reference coordinate system can be inserted as noted above. The computer program can account for model data for orbit-divergent motions of at least one pseudolite, and the computer program can be configured to work together with a position model decoding device of a user terminal. Moreover a computer program product containing a machine-readable program medium, on which a computer program, as noted above, can be stored in the form of electronically readable control signals.

Another aspect of the invention includes a method for the transmission of navigation data to user terminals of a satellite navigation system composed of navigation satellites and pseudolites The method includes transmitting positional information for at least one of the pseudolites, in the same channels and with the same protocols as the transmission of the positional information for the at least one pseudolite. The positional information is transmitted in the form of a model of a pseudolite trajectory in a reference coordinate system which the model accounts for orbit-divergent motions of the at least one pseudolite, and wherein the positional information for the at least on pseudolite forms a part of the navigation data. Moreover, the model for the pseudolite trajectory can take into account at least one of changes in the surface structure of the Earth with time and relative motion of the at least one pseudolite relative to the surface of the Earth.

Another aspect of the invention includes a user terminal for a satellite navigation system, the satellite navigation system transmitting navigation data from navigation satellites and pseudolites that includes model data of a pseudolite trajectory in a reference coordinate system inserted. The user terminal including a receiver for receiving the navigation data, and a position model decoding device structured and arranged to extract the model data of a pseudolite trajectory in the reference coordinate system from the navigation data, to account for model data of orbit-divergent motions of at least one pseudolite, and to determine a position of at least one pseudolite according to the model data. The receiver uses the same channels and protocols to receive the positional information of the pseudolites. Moreover, the position model decoding device can be configured to extract from the navigation data model data of a navigation satellite trajectory in the same reference coordinate system and to determine the position of at least one navigation satellite on a basis of the model data. Also, the position model decoding device can be further configured to identify and extract a common model for the pseudolite trajectory and for the navigation satellite trajectory, which model comprises a first submodel that describes orbital motions and a second submodel for describing orbit-divergent motions.

BRIEF DESCRIPTION OF THE DRAWINGS

A special example embodiment of the present invention in the context of a satellite navigation system is explained below using FIGS. 1 and 2.

DETAILED DESCRIPTION OF THE PRESENT INVENTION

Figure 1:
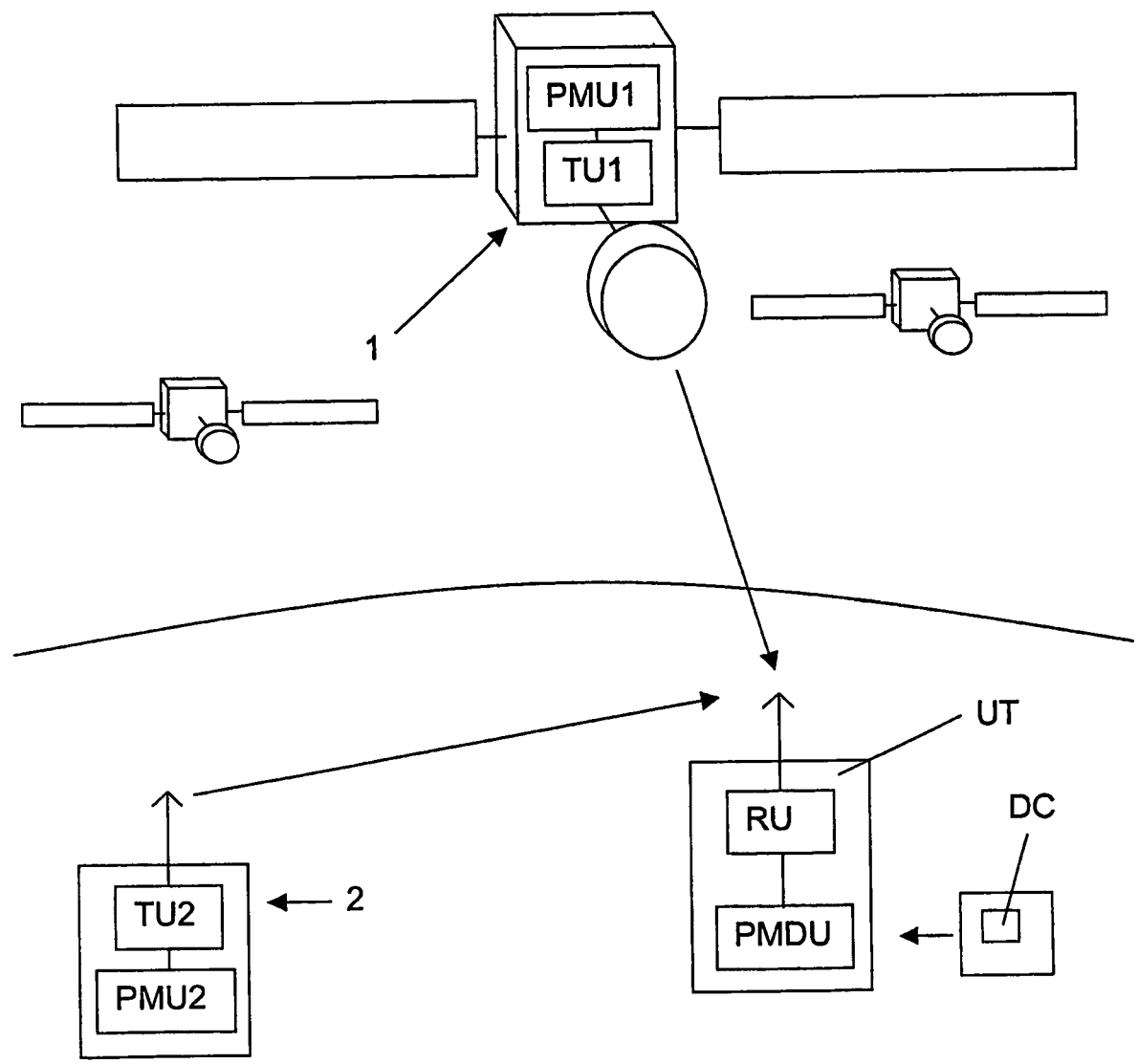
FIG. 1 is schematic representation of a satellite navigation system in accordance with the invention with pseudolites and a terminal in accordance with the invention.

FIG. 1 schematically shows a satellite navigation system with multiple navigation satellites 1 (for example, GPS, GLONASS or similar future systems such as GALILEO) and with pseudolites 2 to increase the precision or redundancy of the satellite navigation system. Represented in FIG. 1 by way of example is a pseudolite 2, which in the case in FIG. 1 would be fixed in place on the surface of the Earth (land or water surface). The pseudolite 2 can, however, also be movable on, under, or over the surface of the Earth, for example on a suitable land vehicle, watercraft, aircraft, or spacecraft. In particular, the pseudolite 2 can in this case be arranged on a vehicle or similar movable body whose motion is predictable or can be estimated, as for example on a train, subway train, river boat or aircraft whose route of travel and travel times or flight path and flight times are relatively precisely known or can be determined, or on a satellite whose trajectory in orbit is likewise relatively precisely known. All navigation satellites 1 have at least one transmission device (transmission unit) TU1 for transmitting navigation data to user terminals (user terminals) UT. This is shown in FIG. 1 by way of example for a navigation satellite 1. The pseudolites 2 each have at least one transmission device TU2 for transmitting navigation data to the user terminals UT.

The navigation satellites 1 additionally have a device (position model unit) PMU1 for preparing model data for the trajectory of at least the relevant navigation satellite 1, which device is connected by data technology to the transmission device TU1 of the navigation satellite 1. The device PMU1 for preparing model data also initiates the insertion of the model data for the trajectory of at least the relevant navigation satellite 1 into the navigation data to be transmitted by this navigation satellite 1. Information about additional navigation satellites 1 and/or pseudolites 2 can also be inserted into the navigation data in the form of an almanac or likewise in the form of a model of the relevant trajectory.

The pseudolites have, in addition to the transmission device TU2, a device PMU2 for preparing model data for the trajectory of at least the relevant pseudolite, which is connected by data technology to the transmission device TU2 of the pseudolite 2. The device PMU2 for preparing model data also initiates the insertion of the model data for the trajectory of at least the relevant pseudolite 2 into the navigation data to be transmitted by this pseudolite 2. Information about additional navigation satellites 1 and/or pseudolites 2 can also be inserted into the navigation data in the form of an almanac or likewise in the form of a model of the relevant trajectory.

Figure 2:
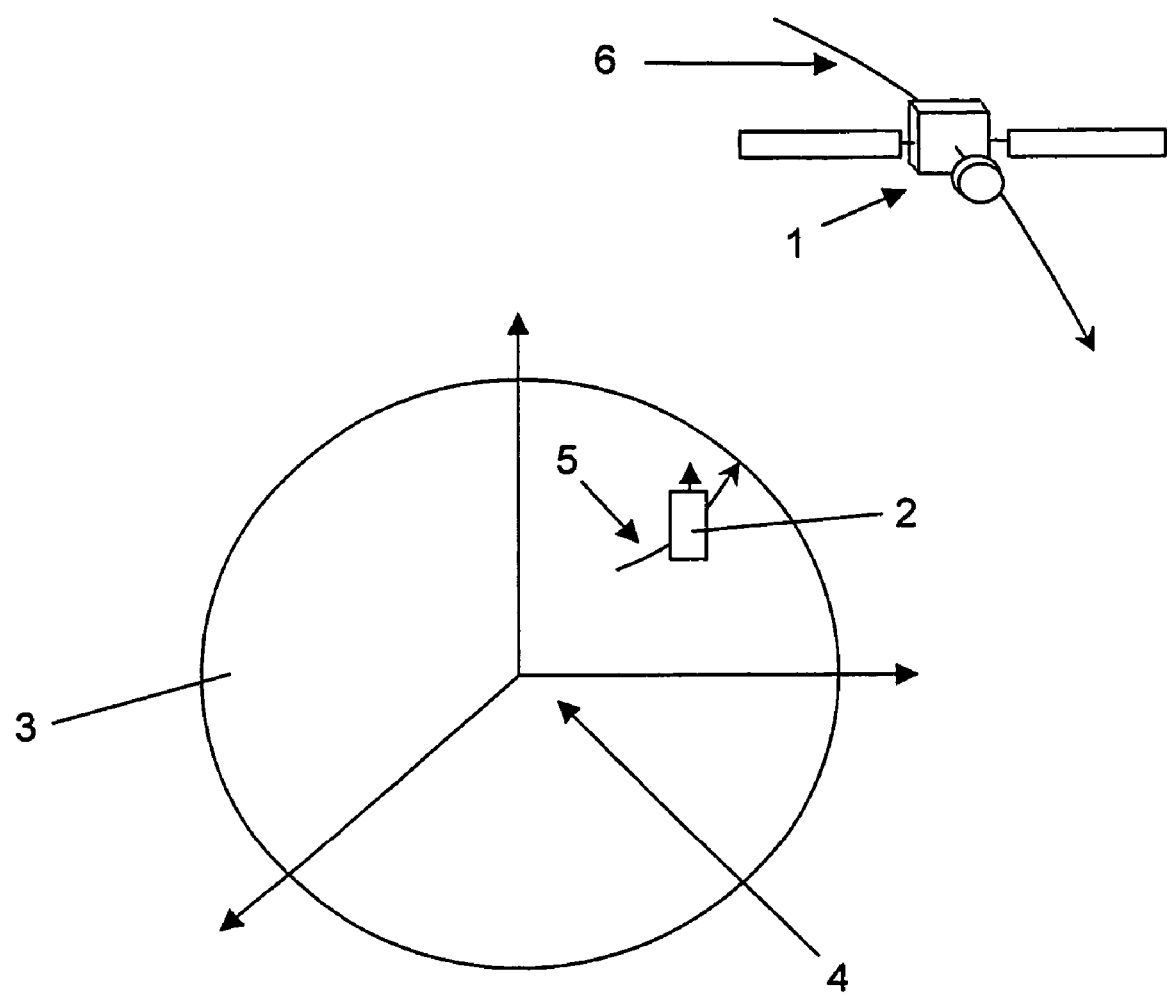
FIG. 2 is schematic representation of a pseudolite trajectory and a navigation satellite trajectory in an inertial reference coordinate system.

Shown in FIG. 2 is a special case for models of the pseudolite trajectories and the navigation satellite trajectories. The reference coordinate system is formed by an inertial coordinate system 4 whose origin lies at the center of the Earth 3 and in which the Earth rotates. From this system, the pseudolite trajectories 5 and the navigation satellite trajectories 6 are based for the pseudolites 2 and the navigation satellites 1. A common model for these pseudolite trajectories 5 and navigation satellite trajectories 6 can now be chosen, which serve to describe the relevant trajectories in the coordinate system 4. In this case the model does not include, by itself, the relevant path for the trajectory of the pseudolites 2 in the form of Keplerian orbit models and the relationship between orbital position and time, but ideally alternatively or additionally includes a modeling of influences on the trajectory that are predictable or can be estimated, as for example due to changes in the surface structure of the Earth with time, in particular from tide effects, or due to relative motions of the pseudolites with respect to the Earth's surface when they are mounted on vehicles or other movable bodies, for example.

The common model is ideally composed of a first submodel for describing orbital motions and a second submodel for describing orbit-divergent motions. To this end, matrix equations in particular can be set up, wherein at least one first matrix A describes an orbital model, thus orbital motions, and at least one second matrix B describes orbit-divergent motions. The overall model can then be composed of the sum of the matrices (A+B), which is then multiplied by a vector x which contains a suitable representation or functions of coordinates and their derivatives for satellites or pseudolites, in order to obtain the equations of motion to represent the trajectories. Individual elements $b_{ij}$ of the matrix B can be set equal to zero in such a manner that the model for the orbit-divergent motions only applies to the pseudolite coordinates and their derivatives. In contrast, individual elements $a_{ij}$ of the matrix A can be set equal to zero in such a manner that the model for the orbital motions only applies to the satellite coordinates and their derivatives. However, the elements of the matrix A can also be chosen such that the model for the orbital motions applies to the satellite coordinates and their derivatives and to the pseudolite coordinates and their derivatives, wherein the model for the pseudolite coordinates and their derivatives is supplemented by the model for the orbit-divergent motions and can thus more realistically describe the pseudolite trajectory than a model based solely on ephemeris data.

However, different models can also be chosen for the pseudolite trajectories 5 and the navigation satellite trajectories 6. In this context, in a manner analogous to the models described above, an orbital model can be chosen for the satellite coordinates and their derivatives and a model for the orbit-divergent motions can be chosen for the pseudolite coordinates and their derivatives, wherein the latter model can be provided as a supplement to an orbital model for pseudolite coordinates and their derivatives. These different models can then be identified in the navigation data, for example through a special flag, which is placed ahead of the corresponding model data. For simplification, a unified data format is ideally chosen for the model data in each of these two cases.

In order to keep the expenditure of transmission capacity and the expenditure for the user terminals as low as possible, the navigation data of all navigation satellites 1 and pseudolites 2 can be transmitted on the same frequency or in the same frequency band in a code-division multiplex process.

The user terminal UT has a position model decoding device (position model decoding unit) PMDU that is connected to the receiving device RU and is used for extracting the model data of a pseudolite trajectory 5 and a navigation satellite trajectory 6 in the cited reference coordinate system 4 from the received navigation data. A model that accounts for orbit-divergent motions of the pseudolite 2 is used for the pseudolite trajectory. Thus, as mentioned, not only is one representation of the pseudolite position performed with the aid of ephemeris data, hence of orbital models that describe the trajectory of pseudolites only inadequately, but in addition, the orbit-divergent motions of the pseudolite 2 in particular are modeled. This can either take place as an alternative to a representation of the pseudolite trajectory 5 using an orbital model (e.g., ephemeris data) or in combination with a representation of the pseudolite trajectory 5 using an orbital model (e.g., ephemeris data), thus in the latter case as an improvement of an existing orbital model.

Furthermore, the one position model decoding device (position model decoding unit) PMDU is used for position determination of navigation satellites 1 and pseudolites 2 on the basis of model data. The position model decoding device PMDU detects in this process whether a common model is present for the pseudolite trajectory 5 and for the navigation satellite trajectory 6, or whether separate models are present for the pseudolite trajectory 5 and for the navigation satellite trajectory 6, which are identified within the navigation data by a suitable flag, for example, which precedes the model data.

If a unified data format is chosen for all navigation data, and thus for all model data, as proposed in this aspect of the present invention, the receiving device RU and the position model decoding device PMDU of the user terminals UT are also appropriately adapted for processing this unified data format, which ultimately results in a simplification of the user terminal UT. Similar considerations apply if all navigation data are transmitted using code-division multiplexing on the same frequency or in the same frequency band. The receiving device RU can then be designed such that navigation data from the navigation satellites 1 and the pseudolites 2 can be received on the same frequency or in the same frequency band, and on the other hand the navigation data of each pseudolite 2 and each navigation satellite 1 can be decoded with the aid of a separate code for each.

All process steps necessary in the user terminal for processing the navigation data in the position model decoding device PMDU or parts thereof can be executed by a computer program. To this end, the computer program is adapted to work together with the position model decoding device PMDU of the user terminal UT. The computer program can be introduced into the user terminal UT with the aid of a computer program product, wherein the computer program product contains a machine-readable program medium (data carrier) DC on which the computer program is stored in the form of electronically readable control signals. One example for the program media would be a chip card with a semiconductor chip in which the computer program is stored. However, all other suitable types of computer program products can also be used, as has been discussed already.

What is claimed is:

1. A method for transmission of navigation data to user terminals of a satellite navigation system composed of navigation satellites and pseudolites, comprising:
   transmitting positional information for at least one of the pseudolites as part of the navigation data, without the use of separate channels or protocols, wherein the positional information is transmitted in the form of a model of a pseudolite trajectory in a reference coordinate system which the model accounts for orbit-divergent motions of the at least one pseudolite; and
   transmitting positional information for the navigation satellites in the form of a model of a navigation satellite trajectory in the same reference coordinate system and using a different model for the pseudolite trajectory,
   wherein identification of the model is included within the navigation data.

2. A satellite navigation system composed of navigation satellites and pseudolites, the system comprising:
   navigation satellite transmitters, associated with the navigation satellites, that transmit navigation data to user terminals;
   pseudolite transmitters, associated with the pseudolites, that transmit navigation data to user terminals; and
   pseudolite modeling devices, associated with each of the pseudolites, that are structured and arranged to prepare model data of a pseudolite trajectory in a reference coordinate system, wherein the model data accounts for orbit-divergent motions of each of the pseudolites, and said modeling devices are configured to insert the model data into the navigation data,
   wherein each navigation satellite further comprises:
   a navigation satellite modeling device structured and arranged to prepare model data of a navigation satellite trajectory in the same reference coordinate system, wherein the model data is inserted into the navigation data,
   wherein the model data of said pseudolite modeling devices are different from the model data of the navigation satellite modeling device, the model data comprises a first submodel that describes orbital motions and a second submodel that describes orbit-divergent motions, and identification of the applicable model is included within the navigation data.

3. A user terminal for a satellite navigation system, said satellite navigation system transmitting navigation data from navigation satellites and pseudolites that includes model data of a pseudolite trajectory in a reference coordinate system by transmitting positional information for at least one of the pseudolites as part of the navigation data, without the use of separate channels or protocols, such that the positional information is transmitted in the form of a model of a pseudolite trajectory in a reference coordinate system which the model accounts for orbit-divergent motions of the at least one pseudolite, the user terminal comprising:

a receiver for receiving the navigation data;

a position model decoding device structured and arranged to extract the model data of a pseudolite trajectory in the reference coordinate system from the navigation data, to account for model data of orbit-divergent motions of at least one pseudolite, and to determine a position of at least one pseudolite according to the model data, without separate devices for receiving and for decoding separate channels or protocols for positional information of the pseudolites, wherein the position model decoding device is also configured to extract model data of a navigation satellite trajectory in the same reference coordinate system from the navigation data and to determine the position of at least one navigation satellite on a basis of the model data, wherein the position model decoding device is configured to identify and extract separate models for the pseudolite trajectory and for the navigation satellite trajectory based on identification of the applicable model within the navigation data.

* * * * *